(12) United States Patent
Hochgesang et al.

(10) Patent No.: US 12,331,768 B2
(45) Date of Patent: Jun. 17, 2025

(54) APPARATUS FOR LINKING ARTICLES OF FURNITURE

(71) Applicant: Ditto Sales, Inc., Jasper, IN (US)

(72) Inventors: Derrick Hochgesang, Huntingburg, IN (US); Tyler Deaton, Evansville, IN (US); Eric Harrison, Florence, WI (US)

(73) Assignee: Ditto Sales, Inc., Jasper, IN (US)

( * ) Notice: Subject to any disclaimer, the term of this patent is extended or adjusted under 35 U.S.C. 154(b) by 332 days.

(21) Appl. No.: 18/159,130

(22) Filed: Jan. 25, 2023

(65) Prior Publication Data

US 2023/0320484 A1  Oct. 12, 2023

Related U.S. Application Data

(63) Continuation-in-part of application No. 17/658,913, filed on Apr. 12, 2022, now abandoned.

(51) Int. Cl.
*F16B 12/20* (2006.01)
*A47C 13/00* (2006.01)

(52) U.S. Cl.
CPC ........ *F16B 12/2009* (2013.01); *A47C 13/005* (2013.01); *A47B 2230/13* (2013.01); *F16B 2012/209* (2013.01)

(58) Field of Classification Search
CPC . A47C 13/005; F16B 2/06; F16B 2/18; F16B 2/185; F16B 2/22; F16B 2/24; F16B 2/241; F16B 2/245; F16B 2/246; F16B 7/0433; F16B 12/20; F16B 12/2009; F16B 12/26; F16B 12/32; F16B 2012/103;
(Continued)

(56) References Cited

U.S. PATENT DOCUMENTS 1,519,187 A * 12/1924 Braley .................... B25B 5/125
                                                    269/238
2,499,985 A *  3/1950 Cafiero ................... F16B 2/065
                                                    403/391
(Continued)

FOREIGN PATENT DOCUMENTS

DE    2163994 A1 *  7/1972 ............. F16B 2/185
FR     331062 A  *  8/1903 .......... F16B 12/2009
(Continued)

*Primary Examiner* — Josh Skroupa
(74) *Attorney, Agent, or Firm* — Maginot, Moore & Beck (57) ABSTRACT

A linking assembly is provided for linking two articles of furniture that includes a support member and a latch member that are pivotably connected by a lever member. The support member includes a hook portion configured to engage a link engagement opening in a beam of one of the articles of furniture. The latch member also includes a hook portion configured to engage the link engagement opening of the other beam. The lever member is pivotably connected to the support and latch members, and is configured in an open configuration so that the hook portions of the support and latch members are separated by a distance that is greater than the combined width of the two beams being connected. The lever member is further configured to draw the support and latch members together as the lever member is pivoted, so that wings of the support and latch members clamp against the two beams.

6 Claims, 9 Drawing Sheets

(58) Field of Classification Search
CPC ........... F16B 2012/209; Y10T 403/553; Y10T 403/595; Y10T 403/7117; Y10T 403/7123; Y10T 403/7129; Y10T 403/7141; Y10T 403/7171
USPC .... 403/294, 322.4, 387, 388, 389, 391, 396; 297/248
See application file for complete search history.

(56) References Cited

U.S. PATENT DOCUMENTS

| | | | | |
|---|---|---|---|---|
| 3,494,641 | A * | 2/1970 | Caregnato | F16L 37/20 403/322.4 |
| 7,350,760 | B2 * | 4/2008 | Yamaura | E04G 17/04 403/322.4 |
| 7,806,474 | B2 | 10/2010 | Wahl et al. | |
| 8,225,581 | B2 * | 7/2012 | Strickland | E04C 3/07 52/855 |
| 10,125,801 | B2 * | 11/2018 | Wilson | F16B 2/245 |
| 10,363,985 | B2 * | 7/2019 | Muller | F16B 2/185 |

FOREIGN PATENT DOCUMENTS

| | | | | |
|---|---|---|---|---|
| FR | 371184 A * | 2/1907 | ........... | F16B 12/2009 |
| GB | 2351756 A * | 1/2001 | ............. | F16B 7/0433 |
| WO | WO-2017138747 A1 * | 8/2017 | ................ | F16B 2/24 |

\* cited by examiner

APPARATUS FOR LINKING ARTICLES OF FURNITURE

PRIORITY CLAIM

This application is a continuation-in-part of and claims priority to co-pending application Ser. No. 17/658,913, filed on Apr. 12, 2022, the entire disclosure of which is incorporated herein by reference.

BACKGROUND

The present invention relates to articles of furniture and, in particular, to an apparatus for connecting or linking articles of furniture to one another, such as seating furniture of the type used in an office environment, including chairs, lounges, and tables.

Office environments typically include chairs, benches and lounges, together with side tables, for use in conference rooms, waiting rooms, and at other locations within the office environment. The chairs typically include a single seat, while benches and lounges typically include one-, two-, and/or three-seat versions. Side tables may be placed next to the chairs and/or lounges.

A wide variety of connecting arrangements are known for linking or "ganging" adjacent chairs, benches or lounges to one another, and/or for connecting side tables to the seating. The ability to link furniture allows the user to arrange the furniture as desired and as suited for the particular space. For example, the Immix® modular bench system and the Elly™ modular seating system sold by Ditto Sales, Inc. of Jasper, Indiana, allows the components to be mixed and matched and arranged for privacy, collaboration or convenience.

Some seating and/or tables include structures integrated into the articles of furniture for connecting the articles of furniture together. Other arrangements include structurally separate connectors, such as brackets, which are fastened to the undersides of the furniture articles by screws or other fasteners with the use of tools. One disadvantage with this arrangement is that the furniture articles may need to be tilted on their sides, or even up-ended, to allow installation of the brackets. In any event, the brackets are typically difficult to install beneath the furniture when the furniture is in its use orientation. The brackets may also be visible between the adjacent furniture articles, and may therefore detract from the aesthetic appearance of the furniture.

Another approach is shown in U.S. Pat. No. 7,806,474, issued to Kimball International, Inc. on Oct. 5, 2010, which discloses an elongated extruded connector that clips onto channel beams on the underside of a lounge and/or table. The connector extends along most of the length of the channel beams and requires the specially configured beams to receive the connector. Moreover, the connector is a separate component from the furniture so that it must be stored when not in use.

There is a need for an apparatus for linking that can be retained with the furniture, that is readily accessible and that is easy to use.

SUMMARY OF THE DISCLOSURE

An apparatus is provided for linking includes two articles of furniture, in which each article of furniture includes a frame with a hollow beam configured and arranged to abut each other at an outer face thereof when the articles of furniture are linked. In one embodiment, the apparatus comprises a link including an elongated main plate and a pair of wings extending from opposite sides of the main plate to define a generally U-shaped channel, each of the pair of wings including a flange at an end thereof opposite and substantially parallel to the main plate. The flange of each wing includes a hook portion projecting inward from the corresponding wing and overlapping the main plate. The hook portion defines a groove between the corresponding wing and the hook portion.

In another feature of the apparatus, the hollow beam of each article of furniture includes a link engagement opening defined in an inner face of the hollow beam opposite the abutting outer face of the beam. The link engagement opening includes a center opening sized to receive one of said pair of wings therein to allow introduction of the wing into the interior of the hollow beam with the other wing outside the beam. The link engagement opening further includes a linking slot in communication with the center opening that has a width sized to slidably receive the flange therein with a bottom edge of the linking slot disposed within the groove to prevent removal of said link from said linking slot. The link is formed of a resiliently deflectable material so that each of said pair of wings can deflect outward relative to the other of the pair of wings to facilitate engagement of the link to the two beams.

In another feature, the link engagement opening in the hollow beam of at least one of the two articles of furniture includes a storage slot in communication with the center opening. The storage slot has a width sized to slidably receive the main plate with one of the pair of wings inside the corresponding hollow beam. The link can be stored within the storage slot and maintained with the particular article of furniture until it is desired to link the article with another article of furniture.

In another embodiment, the linking apparatus includes a linking assembly that comprises a support member and a latch member that are pivotably connected by a lever member. The support member includes a first wing with a first hook portion configured to engage the link engagement opening of one beam. The latch member includes a second wing with a second hook portion configured to engage the link engagement opening of the other beam. The lever member is pivotably connected to each of the support member and the latch member so that all of the members are pivotable relative to each other. The lever member is configured in an open configuration so that the hook portions of the support member and the latch member are separated by a distance that is greater than the combined width of the two beams being connected. The lever member is further configured to draw the support member and latch member together as the lever member is pivoted, so that the wings of the support and latch members clamp against the two beams.

DETAILED DESCRIPTION

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles disclosed herein as would normally occur to one skilled in the art to which this disclosure pertains.

Figure 1:
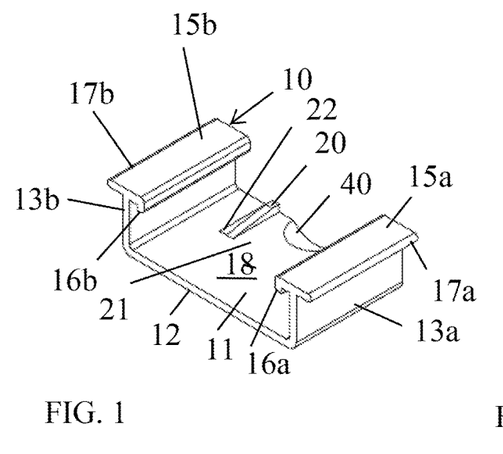
FIG. 1 is a top perspective view of a link of the apparatus of the present disclosure.
Figure 2:
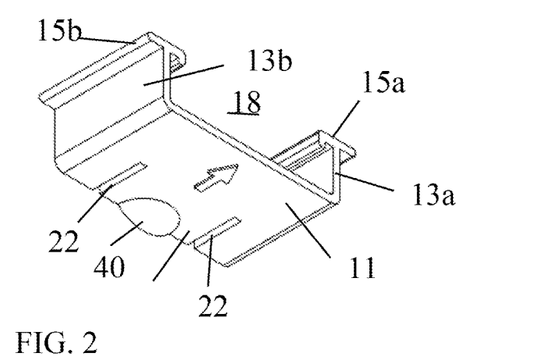
FIG. 2 is a bottom perspective view of a link of the apparatus of the present disclosure.
Figure 3:
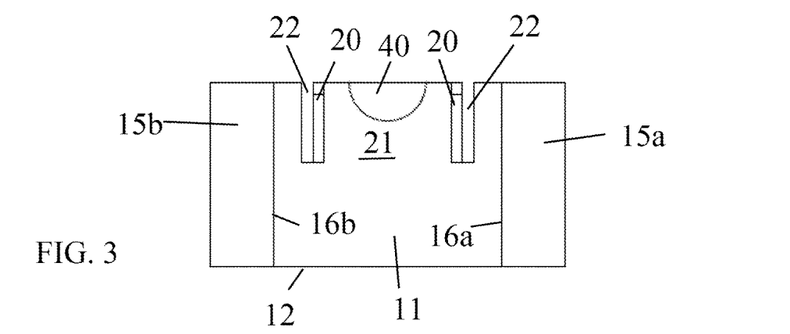
FIG. 3 is a top view of the link shown in FIG. 1.
Figure 4:
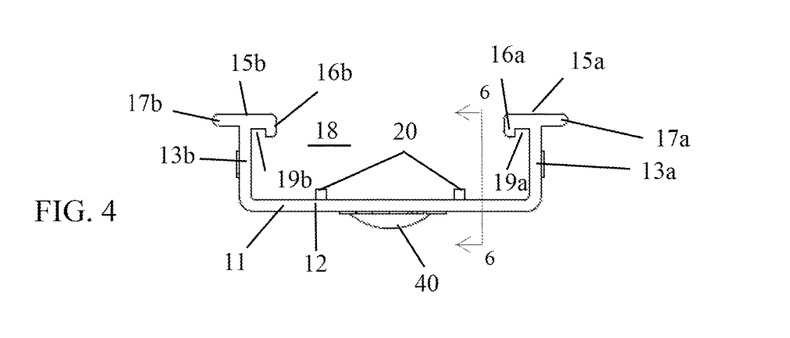
FIG. 4 is an end view of the link shown in FIG. 1.
Figure 5:
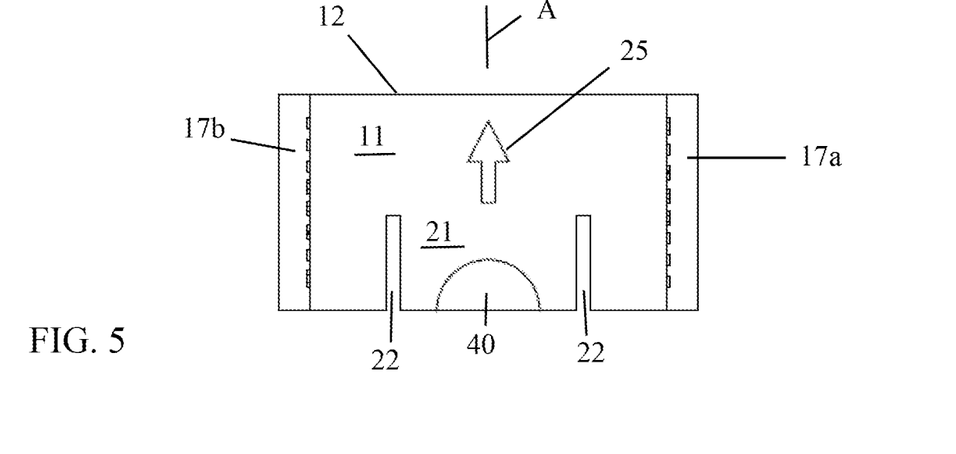
FIG. 5 is a bottom view of the link shown in FIG. 1.
Figure 6:
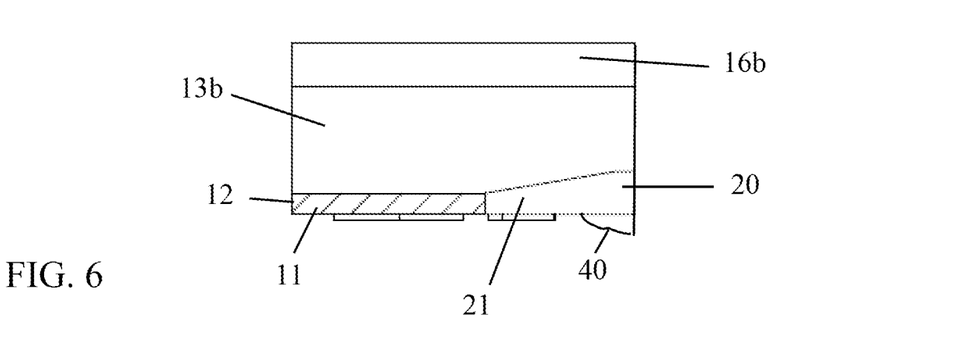
FIG. 6 is cross-sectional view of the link shown FIG. 3, as viewed in the direction of the arrows.

A link 10 for linking furniture is shown in FIGS. 1-6. The link 10 is generally U-shaped with a main plate 11 that is generally rectangular and that is flanked at its sides by a pair of wings 13a, b that extend generally perpendicular from the main plate. The wings 13a, b terminate in a corresponding flange 15a, b that is offset from the plate and can extend generally parallel to the main plate 11. As best seen in FIG. 4, each flange 15a, b includes a hook portion 16 a, b that overlaps a portion of the main plate, and an outer tab portion 17 a, b that extends sideways from the corresponding wing. As can be appreciated from FIGS. 1 and 4, the main plate 11 and wings 13 a, b define a channel 18 along an axis A (FIG. 5). Each hook portion 16 a, b extends downward toward the main plate, offset from the inner surface of the associated wing 13 a, b, to form a corresponding groove 19 a, b. The main plate 13 includes a resilient latch component that include pair of latches 20 mounted on or integral with a latch plate 21 that is defined in the main plate by a pair of slots 22. It can be appreciated that the slots 22 allow the latch plate 21 to deflect relative to the rest of the main plate 11. The latches 20 are inclined, as shown in FIG. 6, with the height of the latches increasing away from the leading edge 12 of the plate 11. In an alternative embodiment, the deflectable latch plate can be replaced with at least one prong, and preferably two prongs, which incorporate the inclined latch 20 and that are resiliently deflectable on their own relative to the main plate.

The main plate 11 includes indicia 25 on the bottom face, as shown in FIG. 5, which identifies the front of the plate, or the leading edge 12. As explained in more detail below, the indicia 25 points to the direction to move the link 10 to latch the link to the furniture being connected.

The link 10 is formed of a strong but resiliently deflectable material. In one embodiment, the link is formed as one piece from a plastic or a resin. In a specific embodiment, the link 10 is formed of Nylon 910 that is well-suited to fabrication in a 3D or additive printing process. The material of the link allows the latch plate 21 to deflect relative to the main plate when force is applied to the latch plate or prongs 20, and then spring back to a coplanar orientation with the main plate when the force is removed. The material of the plate also allows the wings 13a, b to deflect outward relative to each other and then resiliently return to the original U-shape.

Figure 7:
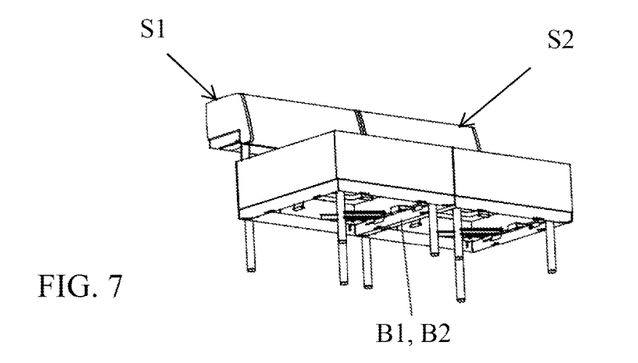
FIG. 7 is bottom perspective view of furniture that can be linked by the apparatus of the present disclosure.
Figure 8:
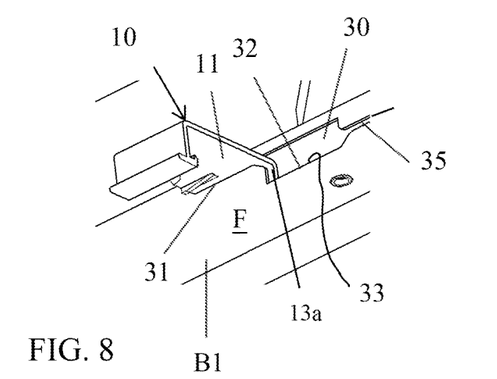
FIG. 8 is an enlarged perspective view underneath the furniture shown in FIG. 7, showing the link of FIG. 1 in a first stowed position.
Figure 9:
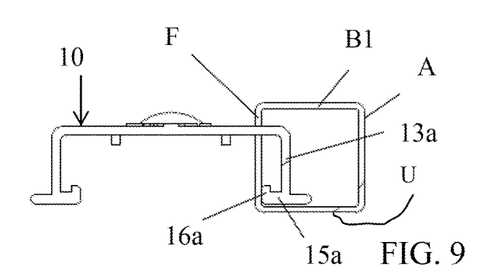
FIG. 9 is an end cut-away view of the link and beam of the furniture shown in FIG. 8 with the link in the first stowed position.
Figure 10:
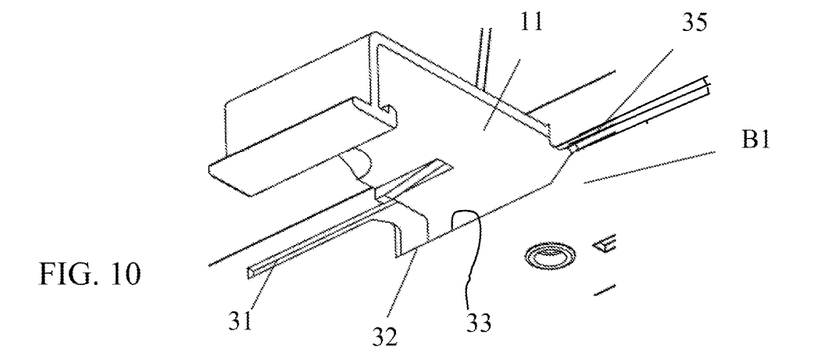
FIG. 10 is an enlarged perspective view underneath the furniture shown in FIG. 7, showing the link of FIG. 1 in a second intermediate position.

The link 10 is configured to engage adjacent articles of furniture and hold them together. In one specific application, the link 10 is part of a linking assembly incorporated into seating furniture S1, S2, which can be a pair of bench seats as shown in FIG. 7. The furniture S1, S2 include a base having a beam construction for strength and rigidity. In one embodiment, the furniture S1, S2 includes side beams B1, B2 that can abut each other when the two bench seats are linked. As shown in FIG. 9, the beams are generally hollow rectangular box beams that extend along the length of a side of the furniture. The linking assembly of the present disclosure includes a link engagement opening 30 defined through the wall of each side beam B1, B2, as shown in FIGS. 8 and 10. In particular, the link engagement openings 30 are defined in the inboard face F of each beam, and not in the abutting faces A of the beams. Each engagement opening 30 includes a storage slot 31 that leads to a center opening 32 and then to a linking slot 35. The link 10 is sized to fit through the center opening 32, as shown in FIG. 10, so that the link can be moved into the storage slot 31. Each center opening 32 is sized so that the wing 13a, b and flange 15a, b can fit through the opening 32, as depicted in FIG. 10. Once one wing 13a of the link 10 is within the interior of the beam B1, the link can be moved toward the storage slot 31, and in particular so that the main plate 11 extends into the slot 31, as shown in FIG. 8. A wing 13a and associated flange 15a of one side of the link is seated within the interior of the beam B1, as shown in FIG. 9. In this position, the link 10 is retained with the furniture S1 and is stored in that location until it is needed to link the furniture S1 with the furniture S2. It can be appreciated that the storage slot 31 has a width that is sufficient for the main plate 11 to slide within the slot. As can be appreciated from FIG. 8, the wing 13a is situated inside the beam and prevents the link 10 from being removed from the storage slot 31. Removal requires moving the link 11 to the center opening 32.

Figure 11:
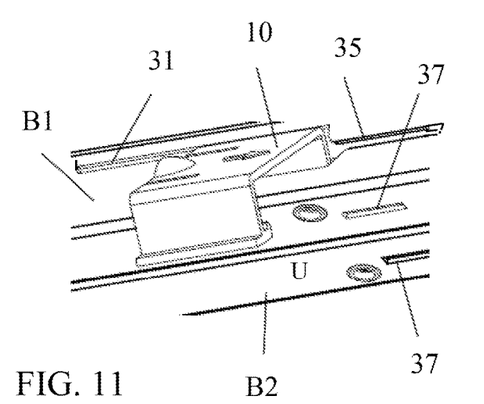
FIG. 11 is an enlarged perspective view underneath the furniture shown in FIG. 7, showing the link of FIG. 1 in a third pivoting position.
Figure 12:
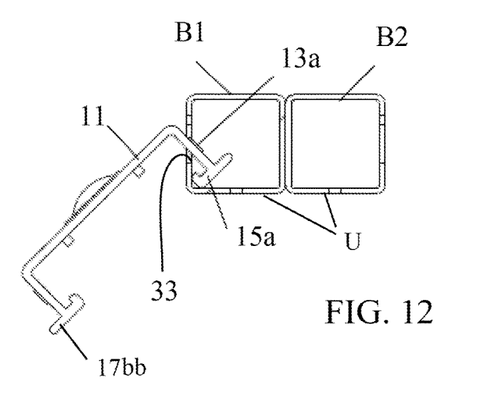
FIG. 12 is an end cut-away view of the link and beam of the furniture shown in FIG. 11 with the link in the third pivoting position.
Figure 13:
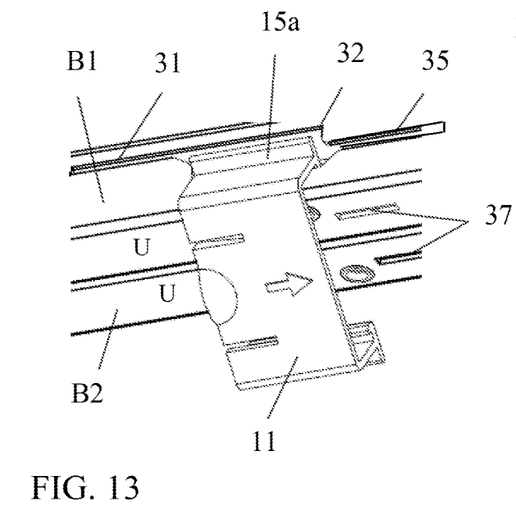
FIG. 13 is an enlarged perspective view underneath the furniture shown in FIG. 7, showing the link of FIG. 1 in a fourth pivoting position
Figure 14:
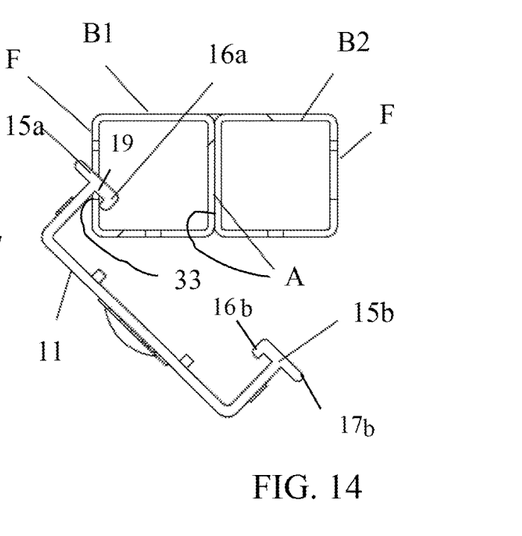
FIG. 14 is an end cut-away view of the link and beam of the furniture shown in FIG. 13 with the link in the fourth pivoting position.
Figure 15:
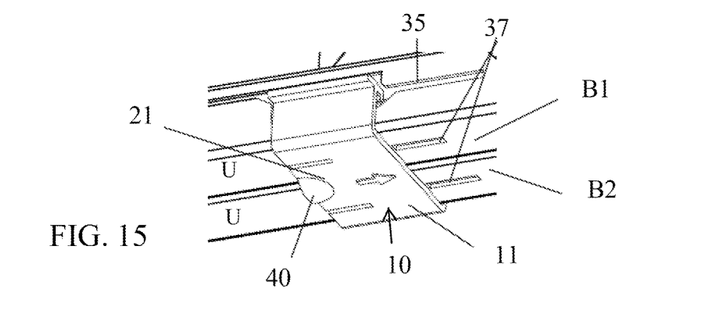
FIG. 15 is an enlarged perspective view underneath the furniture shown in FIG. 7, showing the link of FIG. 1 in a fifth locking position

When it is desired to use the link, the link is moved in the direction of the arrow in the indicia 25 from the storage slot 31 into the center opening 32, as shown in FIG. 10. In this location, the link 10 can be pivoted downward, as shown in FIGS. 11-12. The outer tab 17b on the wing 13b can be used to pivot the link. In this position, a portion of the first wing 13a and the entire flange 15a is still seated within the interior of the beam B1. The wing 13a rests against the edge 33 of the center opening (FIGS. 9, 11) which acts as a fulcrum for pivoting the link further from the opening 30. As the link pivots further, the hook portion 16a engages the side wall of the beam B1 and the edge 33 is situated in the groove 19a, as shown in FIGS. 13-14. The hook portion thus allows the link 10 to swing under the beam B1 without being dislodged from the beam opening 30. The link 10 is pivoted through the positions shown in FIGS. 11-15 until the main plate 11 is generally parallel to the bottom or underside U of the beam B1 (FIG. 15). It can be appreciated that as the link is pivoted upward toward the second beam B2, the second hook portion 16b will contact the second beam B2. As the link is pivoted further upward, by manual pressure on the tab portion 17b, the second wing 13b will deflect outward as the hook portion 16b moves along the outer face F of the beam. Once the hook portion 16b reaches the center opening 32 of the second beam B2, the wing 13b resiliently snaps back to its original U-shaped configuration and the hook portion 13b moves into the opening 32. The link can be shifted upward while it is being pivoted so that the main plate 11 approaches the underside U of the two beams B1, B2. With this movement, the opposite wing 13 thus approaches the inboard face F of the other beam B2 and the hook portion 16 enters the center opening 32 of the other beam. It can be appreciated that the main plate 11 has a length between the wings 13a, 13b to accept the width of the two beams B1, B2 in a close fit to hold the two beams, and thus the articles of furniture, together.

Figure 16:
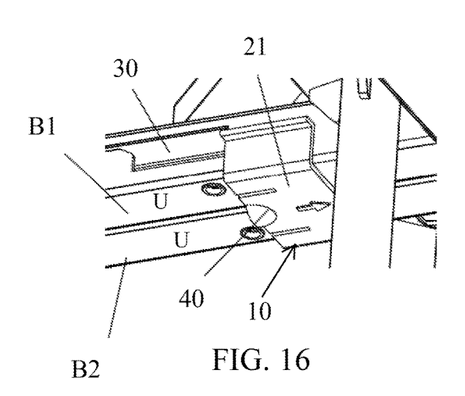
FIG. 16 is an enlarged perspective view underneath the furniture shown in FIG. 7, showing the link of FIG. 1 in a final locking position
Figure 17:
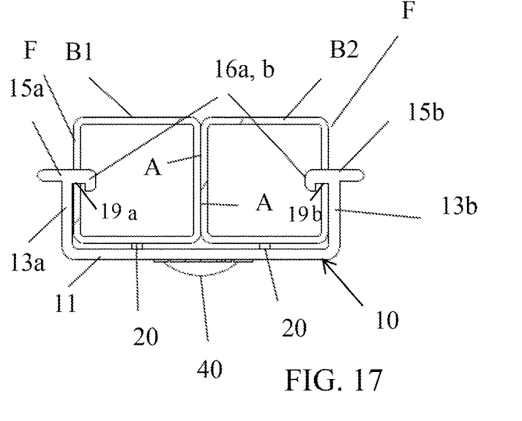
FIG. 17 is an end cut-away view of the link and beam of the furniture shown in FIG. 16 with the link in the final locking position
Figure 18:
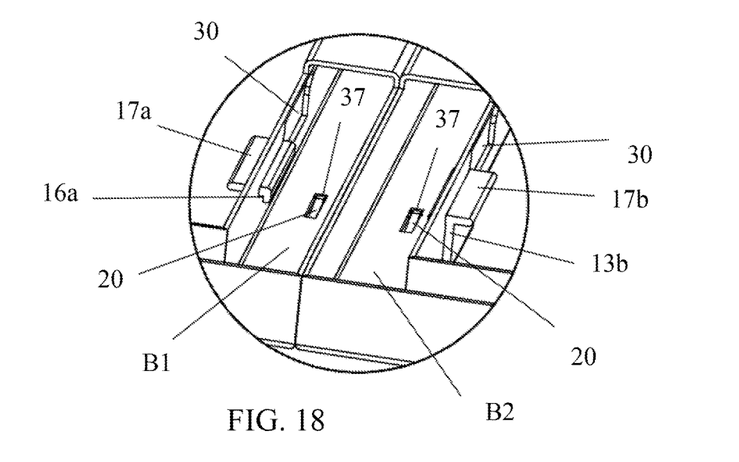
FIG. 18 is a cut-away view into the beam showing the link in the final locking position of FIGS. 17-18.
Figure 19:
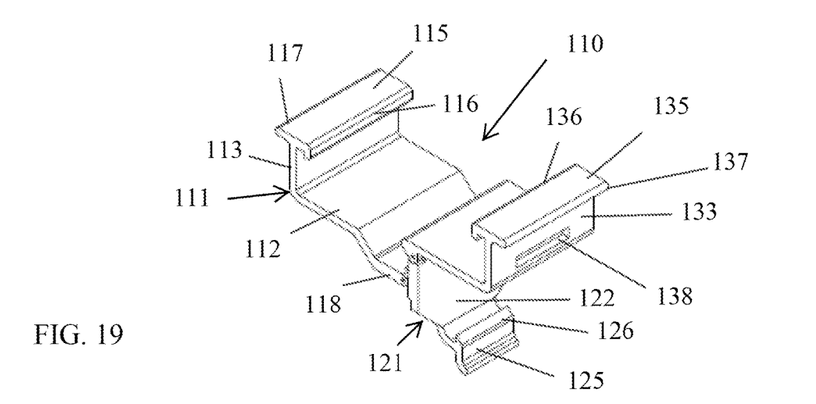
FIG. 19 is a perspective view of a linking apparatus according to a further embodiment, with the apparatus in an open configuration.

In this position, the flanges 15 and hook portions 16 at each side of the link are disposed in the interior of their respective beams B1, B2. The link 10 can be pushed upward so that the main plate 11 contacts the underside U of each beam B1, B2 and, more importantly, so that the flanges 15a, b and grooves 19 a, b are aligned with the linking slots 35 of each beam, as shown in FIGS. 15-17. As best seen in FIG. 8, the linking slot 35 is offset from the lower edge 33 of the center opening 32. Consequently, it is necessary to move the entire link upward until the flanges 15a, 15b are aligned with the linking slots 35 of the two beams B1, B2. The link 10 can then be moved in the direction of the arrow in the indicia 25 so that the flanges 15 a, b simultaneously enter the linking slots 35 of both beams B1, B2, with the bottom edge of the linking slots disposed within respective grooves 19 a, b. The linking slots 35 have a width sufficient for the flange to slide within the slot, but not large enough for the hook portion 16 a, b to pass through. As the link is moved deeper into the linking slots, the latches 20 contact the underside U of the beams, causing the latch plate 21 to deflect downward until the latches 20 reach locking slots 37 defined in the bottom face or underside U of the beams. The prongs 20 then spring back to enter the slots 37, as shown in FIG. 18, as the latch plate 21 returns to its coplanar position within the main plate 11.

A finger depression 40 can be defined on the trailing edge of the latch plate 21 that can be used to deflect the latch plate 21 downward to release the latches 20 from the latch slots 37. The link 10 can then be moved back to the center opening 32, where the flange 15 of one side can be removed from the interior of the respective beam. The link essentially moves through the steps described above in reverse order until the main plate 11 is disposed within the storage slot 31 of one of the beams B1, B2. It can be appreciated that the link 10 can be stored in either beam B1, B2 of either of the seating S1, S2. Alternatively, only one of the beams includes the storage slot as part of the link engagement opening 30.

In a specific embodiment, the beams B1, B2 of the furniture S1, S2 can be about 3.0 inches wide, with the main plate 11 of the link 10 having a width between the wings 13 a, b of 3.016 inches. The link can have a height from the bottom surface of the main plate to the top surface of the flange 15 a, b of 1.0 inch. The linking slot 37 of each beam is 0.87 inches from the bottom surface of the beams so that the flanges 15 a, b of the link can be disposed within the two slots. The storage slot 31 can also be at the same height. The link 10 has a length along the axis A of 2.0 inches, so the storage slot 31, center opening 32 and linking slot 35 of the beam opening 30 in each beam have lengths of at least 2.0 inches.

The linking apparatus of the present disclosure includes the link 10 and the engagement openings 30 in the beams B1, B2 of the respective seating S1, S2. For most seating, a single linking apparatus is all that is needed to solidly connect adjacent furniture. For instance, conventional seating, such as the bench seats S1, S2 of the present disclosure, have a depth of 36-48 inches. A single linking apparatus in the middle of the side beams are sufficient to keep the seating connected. In some cases, the furniture may be tables that are to be connected along a length that is greater than the depth of the typical seating. Longer beams may require multiple linking apparatuses along the length of the beams for a stable connection.

FIGS. 19-32 depict a linking apparatus 110 according to a further embodiment of the disclosure. The apparatus 110 includes a support member 111, a lever member 121 pivotably connected to the support member, and a latch member 131 pivotably connected to the lever member, as best seen in FIGS. 19-22. The support member 111 is generally L-shaped and includes a plate 112 with a wing 113 projecting generally perpendicularly from the plate in a manner similar to the link 10 described above. Also like the link 10, the support member 111 includes a flange 115 supported on the wing and extending generally perpendicular to the wing. The flange 115 includes a hook portion 116 and a tab 117 on opposite sides of the wing, with the hook portion disposed toward the interior of the linking apparatus and the tab extending outward and defining a groove 116a. The support member 111 further includes a hinge portion 118 offset from the plate 112 and terminating in a plurality of hinge collars 119.

The lever member 121 includes a plate 122 that includes a plurality of hinge collars 123 projecting from a middle portion of the plate. The hinge collars 123 interleave and align with the hinge collars 119 of the support member so that a hinge pin 140 can extend through all of the hinge collars to pivotably connect the lever member 121 to the support member 111. The lever member includes a plurality of end hinge collars 124 at one end of the plate 122. The other end of the plate 122 forms a tab 125 that can be used to manually pivot the lever member 121 relative to the support member 111, as described herein. The tab 125 extends from a bend 122a at the plate 122, with the plate and tab being configured to deflect under manual pressure on the tab. The lever member further includes a latch 126 projecting inward at the tab 125.

The latch member 131 is generally L-shaped and includes a plate 132 with a wing 133 and flange 135, similar to the plate, wing and flange of the support member 111. The flange 135 includes an inward hook portion 136 and an outward tab 137 similar to the support member. The hook portion defines a groove 136a. The wing 133 defines a notch or opening 138. The wing 133 extends from one end of the plate 132, while the opposite end of the plate defines a plurality of hinge collars 139. The hinge collars 139 interleave and align with the end hinge collars 124 of the lever member 121 to receive a second hinge pin 141 that pivotably connects the latch member 131 to the lever member 121.

Figure 20:
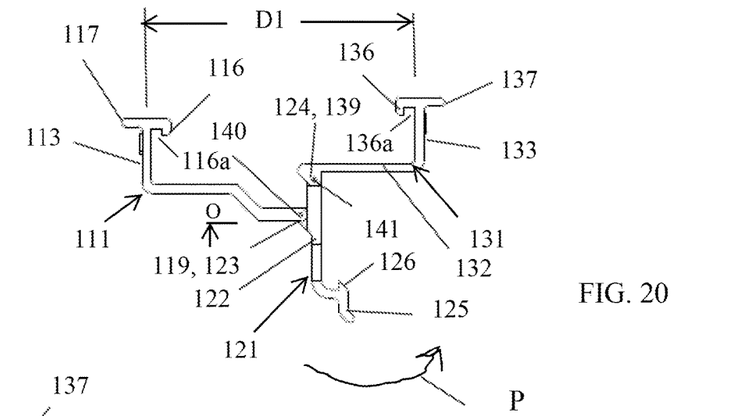
FIG. 20 is a side view of the linking apparatus shown in FIG. 19.
Figure 21:
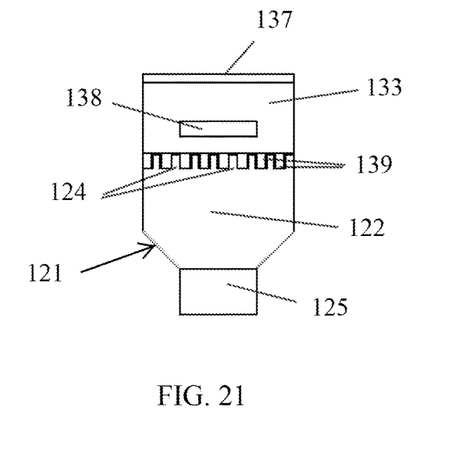
FIG. 21 is an end view of the linking apparatus shown in FIG. 19.
Figure 22:
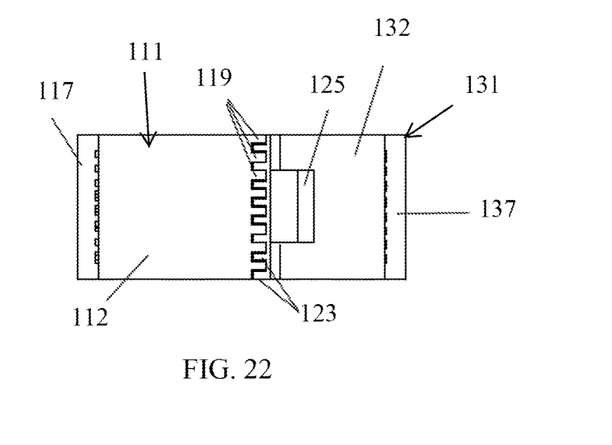
FIG. 22 is a bottom view of the linking apparatus shown in FIG. 19.

The link assembly 110 is shown in its open configuration in FIGS. 19-22. In this configuration, the plate 112 of the support member 111 and the plate 132 of the latch member 131 are generally parallel to each other, as well as the two wings 113, 133. However, the two plates 112, 132 are offset by the lever member 121 that is generally vertically disposed between the two plates, as best seen in FIG. 20—i.e., the two plates are non-coplanar in the open configuration. In this configuration, the distance D1 (FIG. 20) between the two wings 113, 133 is greater than the combined width of the beams B1, B2 of the two articles of furniture being linked (FIG. 12).

Figure 23:
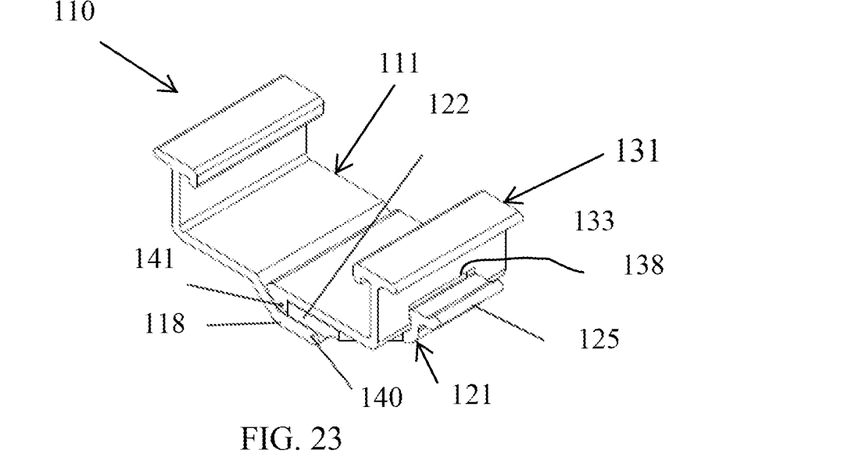
FIG. 23 is a perspective view of the linking apparatus of FIG. 19, with the apparatus in a closed configuration
Figure 24:
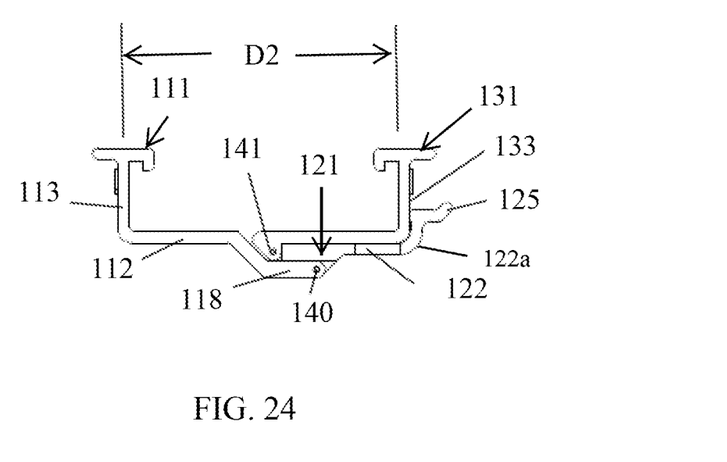
FIG. 24 is a side view of the linking apparatus shown in FIG. 23.

FIGS. 23-24 show the linking apparatus 110 in its closed, or locking, configuration. To reach this configuration, the lever member 121 is pivoted in the direction P (FIG. 20) about the uppermost hinge pin 141. This pivoting movement draws the two plates 112, 122 towards each other. In particular, the pivoting movement draws the latch member 131 laterally and downward toward the support member 111 until the two plates 112 and 122 are generally coplanar, as best seen in FIG. 24. The hinge portion 118 of the support member 111 is a plate that is offset from the plate 112 by a dimension O (FIG. 20) that is sized so that the plate 132 and hinge collars 139 of the latch member and the end hinge portion 124 of the lever member 121 can nest within the hinge portion 118, as shown in FIG. 24. In this closed configuration, the distance D2 between the two wings 113, 133 is less than the distance D1, and more importantly is slightly greater than the combined width of the two articles of furniture. The linking apparatus is held in this closed, or locking, configuration by engagement of the latch 126 within the notch or opening 138 in the wing 133 of the latch member 131. Thus, the lever member 121 is pivoted until the latch 126 snaps into the notch 138. The lever member 126 can be released by pressing down on the tab 125 to disengage the latch 126 from the notch 138. Pressing on the tab 125 can deflect the tab and/or the bend 122a slightly to allow the latch to disengage from the opening/notch 138.

Figure 25:
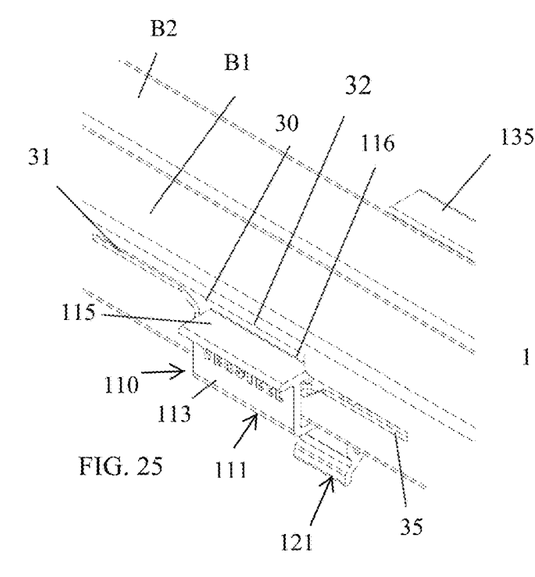
FIG. 25 is an enlarged perspective view underneath the furniture shown in FIG. 7, showing the linking apparatus of FIG. 19 in the open configuration at a first intermediate position on the furniture.
Figure 26:
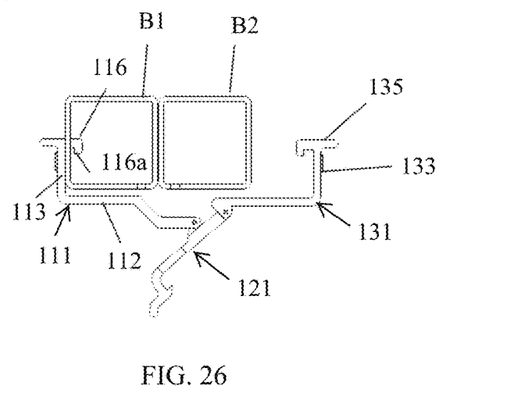
FIG. 26 is a cut-away view of the furniture with the linking apparatus in the open configuration shown in FIG. 25.
Figure 27:
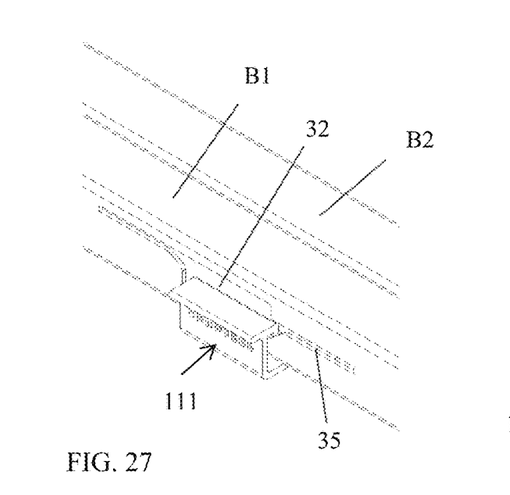
FIG. 27 is an enlarged perspective view of the linking apparatus at a second intermediate position, with the linking apparatus in a partially closed configuration.
Figure 28:
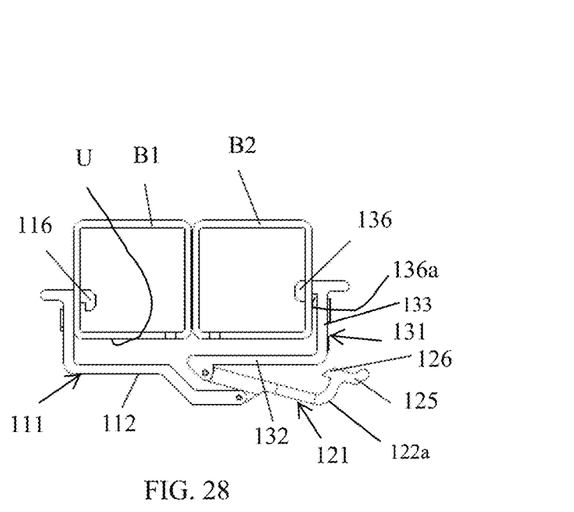
FIG. 28 is a cut-away view of the furniture with the linking apparatus in the configuration shown in FIG. 27.

The operation of the linking apparatus 110 is shown in the sequence illustrated in FIGS. 25-32. It can be appreciated that the beams B1, B2 are configured as described above to include the engagement openings 30 on the outboard faces of the two beams. Each engagement opening 30 includes the storage slot 31 that leads to the center opening 32 and then to the linking slot 35. The linking apparatus is shown in FIGS. 25-26 in a first intermediate position within the center opening 32. In this first intermediate position, the groove 116a of the hook portion 116 of the support member 111 is engaged with the edge 33 (see FIG. 8) of the center opening 32 of beam B1. The apparatus is shown in FIGS. 25-26 with the wing 113 abutting the face of the beam B1. As best seen in FIG. 26, the linking apparatus is in its opening configuration. It is apparent from FIG. 26 that the distance D1 between the wings 113, 133 is much greater than the combined width of the two beams.

At least initially, when the apparatus is placed in the first intermediate position, the apparatus will essentially dangle by the engagement of the groove 116a with the edge 33 of the center opening. The apparatus is pivoted about the hook portion 116 so that the apparatus is oriented as shown in FIG. 26. This allows the apparatus to be moved into a second intermediate position, shown in FIGS. 27, 28, in which the lever member 121 is pivoted upward to draw the support member 111 and latch member 121 together. In this position, the groove 136a of the hook portion 136 of the latch member 131 can engage the edge 33 of the center opening 32 of the second beam B2. In this second intermediate position, the wing 133 does not abut the face of the beam B2, and the linking apparatus is not in its closed configuration. However, in this position, the linking apparatus 110 loosely engages the center openings 32 and edges 33 of the two beams B1, B2 so that the linking apparatus is supported by the beams in the position shown in FIG. 28.

Figure 29:
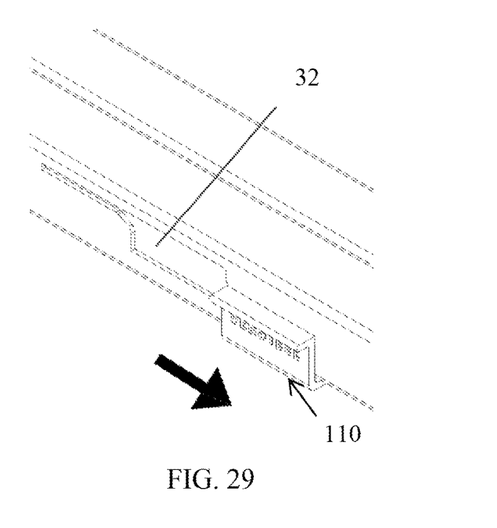
FIG. 29 is an enlarged perspective view of the linking apparatus at a first locking position with the linking apparatus in the partially closed configuration shown in FIG. 27.
Figure 30:
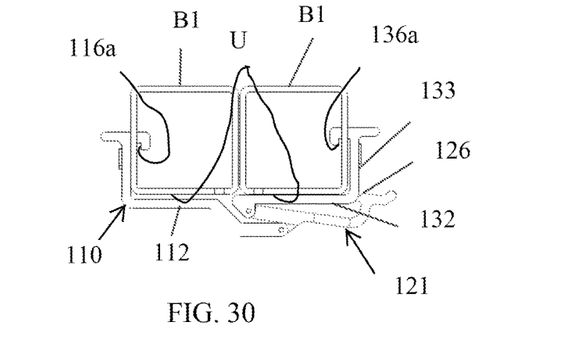
FIG. 30 is a cut-away view of the furniture with the linking apparatus in the partially closed configuration shown in FIG. 29.
Figure 31:
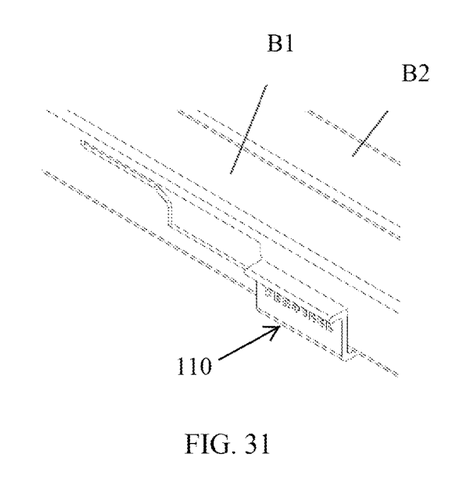
FIG. 31 is an enlarged perspective view of the linking apparatus at a final locking position with the linking apparatus in the closed configuration shown in FIG. 23.
Figure 32:
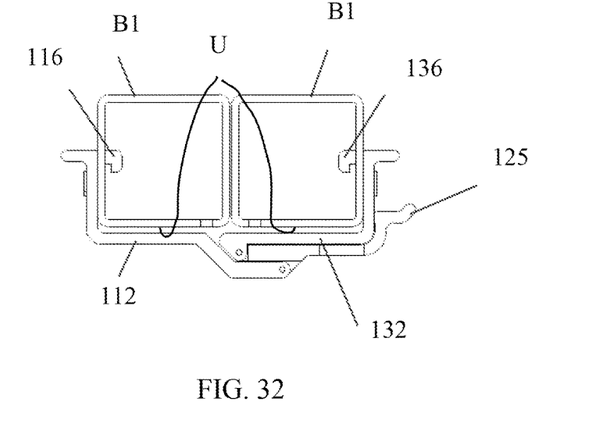
FIG. 32 is cut-away view of the furniture with the linking apparatus in the closed configuration shown in FIG. 31.

Since the linking apparatus is loosely engaged to the engagement openings 30, the apparatus can be slid from the center openings 32 to the linking slots 35 of the two beams, as shown in FIGS. 29-30. Once the linking apparatus 110 is in this first locking position, the lever member 121 can be pivoted further upward until the latch 126 contacts the wing 133 of the latch member 131, as best seen in FIG. 30. Further pivoting of the lever member moves the linking apparatus to the final locking position shown in FIGS. 31-32. In this position, the latch 126 has snapped into the notch 138 of the latch member, as described above. In this position, the two wings 113, 133 are clamped onto the outboard faces of the two beams B1, B2 so that the linking apparatus 110 is firmly clamped or latched onto the beams. As discussed above, the distance D2 between the wings 113, 133 is equal to or slightly greater than the combined width of the two beams. Alternatively, the apparatus can be configured so that the distance D2 is slightly less than the combined width of the beams so that the wings 113, 133 exert a clamping force against the beams.

It can be appreciated that the above-described steps can be reversed to move the linking apparatus 110 to the storage slots 31. In particular, the tab 125 can be depressed to release the latch 126 from the notch 138 so that the lever member 121 can be pivoted downward. As the lever member is pivoted downward, it pushes the latch member 131 slightly outward so that the wings are not clamped onto the sides of the beams. Once this pressure is released, the linking apparatus can be slid along the linking slots 35 back to the center openings 32. When the linking apparatus is at the center opening, the lever member can be pivoted further downward so that the hook portion 136 of the latch member is disengaged from the edge 33 of the center opening. Further pivoting of the lever member moves the linking apparatus to its opening configuration, as shown in FIG. 26. In this position, the entire linking apparatus 110 can pivot about the hook portion 116 still engaged to the edge 33 of the center opening 32 of the beam B1. The linking apparatus can then be moved to the storage slot 31 (FIG. 25) with the linking apparatus suspended from the slot in the manner shown in FIGS. 8-9 for the link 10. It can be appreciated that the lever member 121 and latch member 131 will essentially dangle from the hinge pin 140 when the linking apparatus is in the stowed position. Alternatively, plate of the support member can be disposed within the storage slot 31, with the wing 113 disposed within the beam, in the manner shown in FIG. 8. Again, the lever member and latch member will dangle from the hinge pin 140.

The components of the link assembly 110 can be formed of a plastic or a resin. In a specific embodiment, the link assembly 110 is formed of Nylon 910 that is well-suited to fabrication in a 3D or additive printing process. This material allows the tab 125 and latch 126 to deflect slightly to engage the notch 138 in the wing 133 of the latch member 131. In addition, this material allows the wings 113, 133 to deflect slightly as the linking assembly is clamped onto adjacent beams B1, B2, to exert a clamping force to hold the beams together.

The present disclosure should be considered as illustrative and not restrictive in character. It is understood that only certain embodiments have been presented and that all changes, modifications and further applications that come within the spirit of the disclosure are desired to be protected.

What is claimed is:

1. A linking apparatus for linking two articles of furniture, each article of furniture including a frame with a hollow beam, each having a width and each configured and arranged to abut each other at an outer face thereof when the articles of furniture are linked, the abutting beams having a combined width, the apparatus comprising:
   a linking assembly including;
   a support member including an elongated first plate and a first wing extending from one end of said plate, said first wing including a first flange at an end thereof opposite said first plate, said first flange including a first hook portion projecting inward from the first wing and overlapping said first plate, said first hook defining a first groove between the first wing and the first hook portion, said first plate including a first hinge portion extending from an end opposite said first wing;
   a lever member including an elongated plate with an end hinge portion defined at one end of the plate, a manually engageable tab at an end of said plate opposite said end hinge portion, and an intermediate hinge portion between said end hinge portion and said tab, wherein said intermediate hinge portion of said lever member is pivotably engaged to said hinge portion of said support member so that said lever member can pivot relative to said support member; and
   a latch member including an elongated second plate and a second wing extending from one side of said second plate, said second wing including a second flange at an end thereof opposite said second plate, said second flange including a second hook portion projecting inward from the second wing and overlapping said second plate, said second hook defining a second groove between the second wing and the second hook portion, said second plate including a second hinge portion at an end opposite said second wing, wherein said second hinge portion is pivotably engaged to said end hinge portion of said lever member so that said latch member can pivot relative to said lever member,
   wherein said lever member is configured so that when the lever member is in an open position, the first and second elongated plates are non-coplanar and a first distance between said first wing and said second wing is greater than a combined width of said hollow beams of said two articles of furniture, and
   wherein said lever member is configured so that when the lever member is in a closed position, the first and second elongated plates are substantially coplanar and a second distance between said first wing and said second wing is substantially equal to said combined width of said hollow beams; and
   each hollow beam including a link engagement opening defined in an inner face thereof, said inner face opposite the abutting outer face of the corresponding beam, said link engagement opening of each beam including a center opening sized to receive a corresponding one of said first and second wings therein and a linking slot in communication with said center opening, said linking slot having a width sized to slidably receive a corresponding one of said first and second flanges therein with a bottom edge of said linking slot disposed within the corresponding first and second groove.

2. The linking apparatus of claim 1, wherein:
   the first hinge portion of said support member and the intermediate hinge portion of said lever member include interleaving hinge collars and a hinge pin extending therethrough; and
   the second hinge portion of said latch member and the end hinge portion of said lever member include interleaving hinge collars and a hinge pin extending therethrough.

3. The linking apparatus of claim 1, wherein:
   said second wing of said latch member includes an opening between said second plate and said second flange; and
   said lever member includes a latch configured to engage said opening when said lever member is in said closed position.

4. The linking apparatus of claim 3, wherein said latch is adjacent said manually engageable tab.

5. The linking apparatus of claim 1, wherein said link engagement opening in the hollow beam of at least one of the two articles of furniture includes a storage slot in communication with said center opening, said storage slot having a width sized to slidably receive the first plate with said first wing inside the corresponding hollow beam.

6. The linking apparatus of claim 1, wherein said first hinge portion is offset from said first plate by a dimension sized so that the second plate and second hinge portion of the latch member and the end hinge portion of the lever member can nest within the first hinge portion when the lever member is in the closed position.

* * * * *